(12) United States Patent
Tezuka et al.

(10) Patent No.: US 8,970,156 B2
(45) Date of Patent: Mar. 3, 2015

(54) PATH DISPLAY APPARATUS CONSIDERING CORRECTION DATA

(71) Applicant: FANUC Corporation, Yamanashi (JP)

(72) Inventors: Junichi Tezuka, Yamanashi (JP); Hajime Ogawa, Yamanashi (JP)

(73) Assignee: FANUC Corporation, Yamanashi (JP)

( * ) Notice: Subject to any disclaimer, the term of this patent is extended or adjusted under 35 U.S.C. 154(b) by 180 days.

(21) Appl. No.: 13/705,547

(22) Filed: Dec. 5, 2012

(65) Prior Publication Data

US 2013/0169208 A1 Jul. 4, 2013

(30) Foreign Application Priority Data

Dec. 28, 2011 (JP) ................................. 2011-289045

(51) Int. Cl.
*G05B 19/18* (2006.01)
*G05B 19/19* (2006.01)

(52) U.S. Cl.
CPC ...... *G05B 19/19* (2013.01); *G05B 2219/41032* (2013.01); *G05B 2219/41055* (2013.01)
USPC ...... 318/569; 318/560; 318/600; 318/400.14; 318/721; 483/16; 483/17; 483/28; 483/30; 493/2; 409/80; 700/50; 700/56; 700/61

(58) Field of Classification Search
CPC .................................................. G05B 19/408
USPC ......... 318/569, 600, 571, 572, 573, 574, 575, 318/592, 594, 625, 628, 560, 721, 799, 701, 318/727, 400.01, 430, 432, 437, 652, 632, 318/633, 638, 34, 37, 38, 67, 400.14, 318/400.4; 483/16, 17, 28, 30; 700/50, 56, 700/61; 409/80; 493/2
See application file for complete search history.

(56) References Cited

U.S. PATENT DOCUMENTS 4,742,285 A 5/1988 Sasaki et al.
5,101,146 A 3/1992 Teshima
(Continued)

FOREIGN PATENT DOCUMENTS

DE 3708266 A1 9/1987
DE 4025449 A1 2/1991
(Continued)

OTHER PUBLICATIONS

ISG—Industrielle Steuerungstechnik GmbH: Funktionsbeschreibung "Spindelsteuerungsfehlerkompensation" Software-Version V2.5.3, Stuttgart, Jul. 24, 2002, S. 1-12.

*Primary Examiner* — Antony M Paul
(74) *Attorney, Agent, or Firm* — Lowe Hauptman & Ham, LLP

(57) ABSTRACT

A path display apparatus includes a first position command acquiring unit that acquires first position command for motors, a first position feedback acquiring unit that acquires first position feedback of each of the motors, a correction data acquiring unit that acquires correction data generated for each of the motors, a second position command calculating unit that subtracts the correction data from the first position command to calculate a second position command, a second position feedback calculating unit that subtracts the correction data from the first position feedback to calculate second position feedback, a command path display unit that displays a command path of the tip point of the tool, based on the second position command; and a feedback path display unit that displays a feedback path of the tip point of the tool, based on the second position feedback.

4 Claims, 10 Drawing Sheets

(56) References Cited

U.S. PATENT DOCUMENTS

| | | | |
|---|---|---|---|
| 5,910,721 A * | 6/1999 | Hayashi et al. | 318/649 |
| 6,018,685 A * | 1/2000 | Fujita et al. | 700/61 |
| 6,097,168 A * | 8/2000 | Katoh et al. | 318/568.11 |
| 6,701,212 B2 * | 3/2004 | Shiba et al. | 700/193 |
| 2004/0178693 A1 | 9/2004 | Burgbacher | |

FOREIGN PATENT DOCUMENTS

| | | |
|---|---|---|
| DE | 102004011477 A1 | 9/2004 |
| JP | 3-058102 A | 3/1991 |

\* cited by examiner

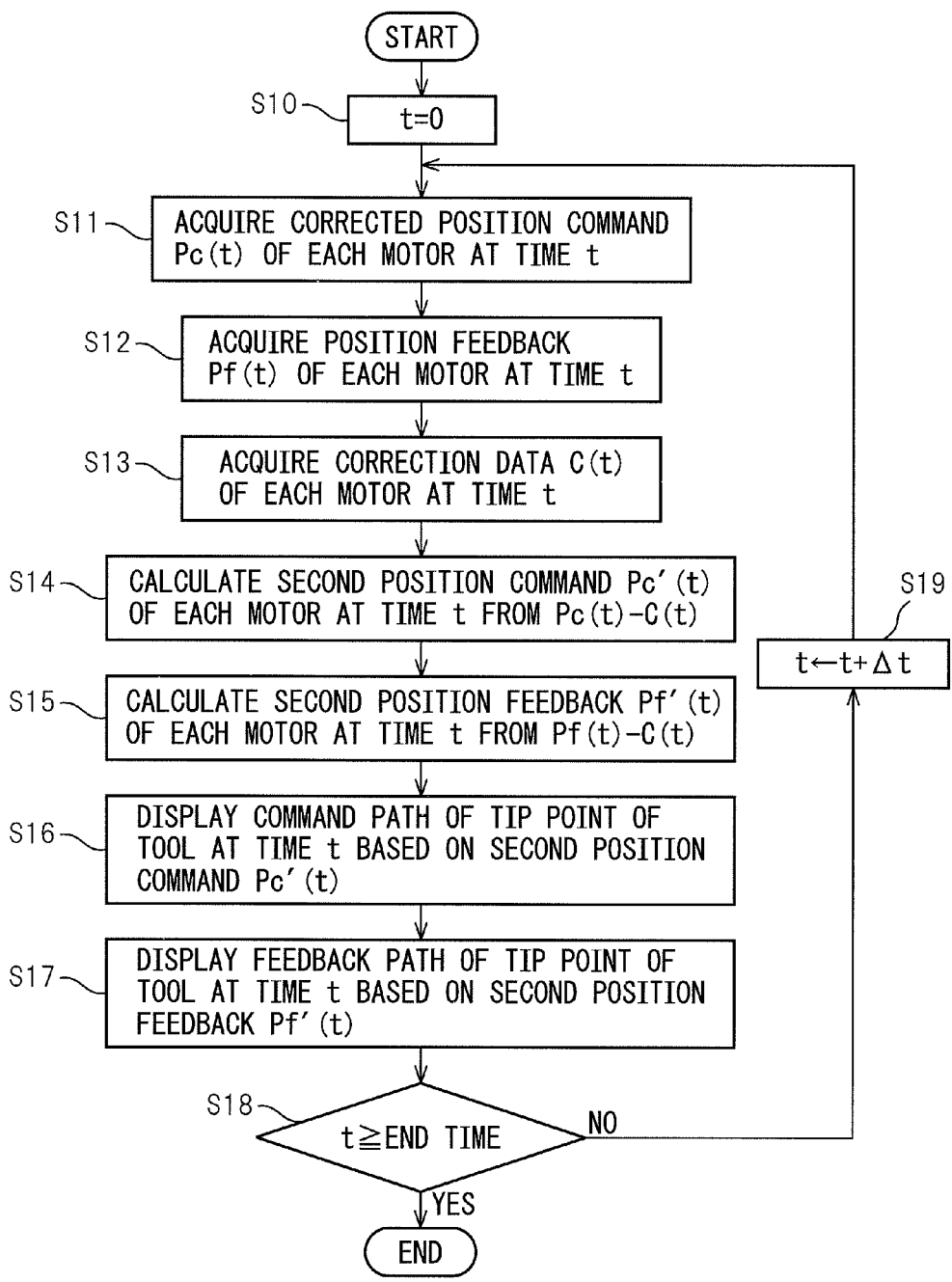

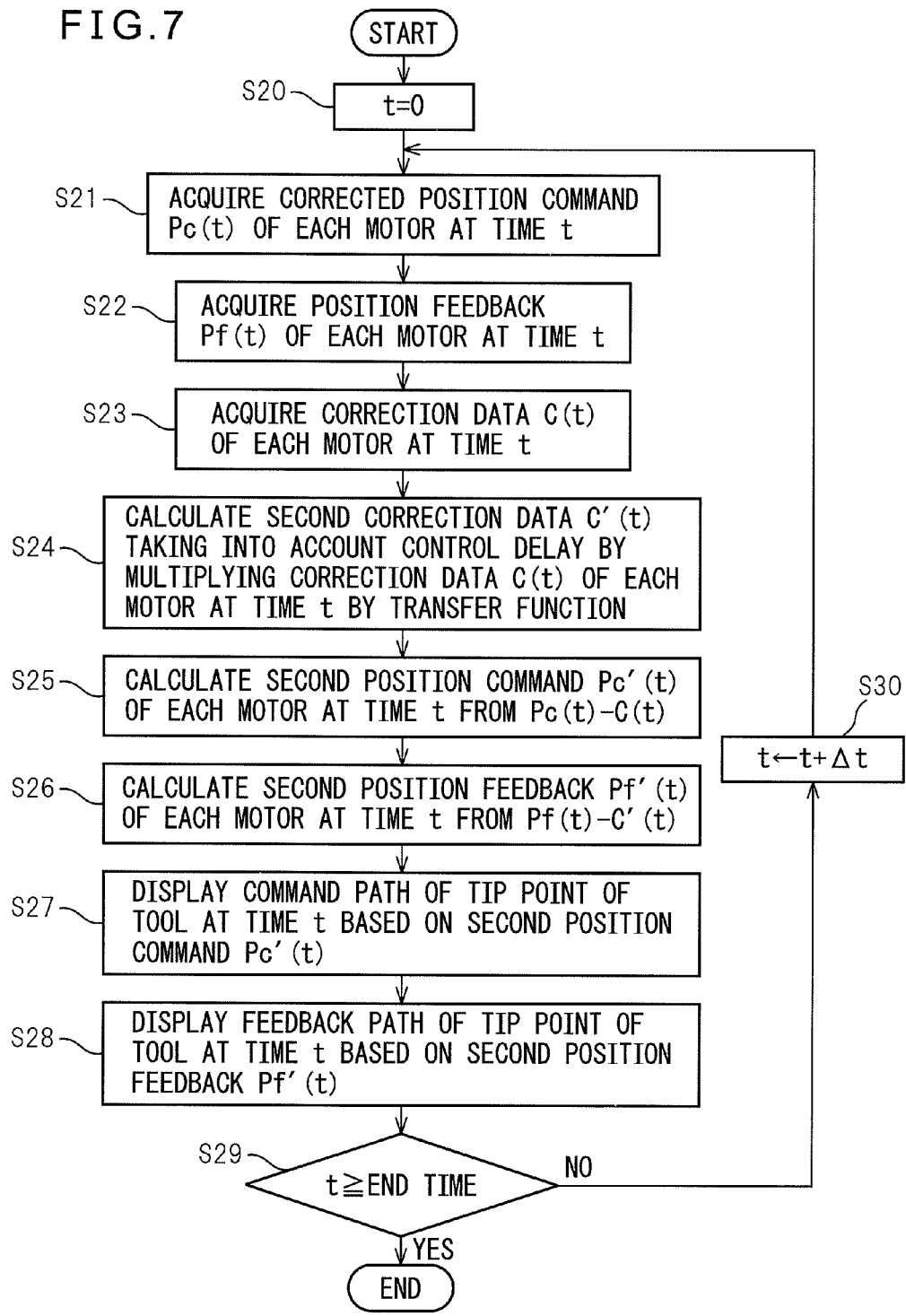

PATH DISPLAY APPARATUS CONSIDERING CORRECTION DATA

RELATED APPLICATIONS

The present application claims priority from Japanese Application No. 2011-289045, filed Dec. 28, 2011, the disclosure of which is hereby incorporated by reference herein in its entirety.

BACKGROUND OF THE INVENTION

1. Technical Field

The present invention relates to a path display apparatus. More specifically, the present invention relates to a path display apparatus that displays the path of the tip point of a tool taking into account correction data such as backlash correction and pitch error correction.

2. Description of Related Arts

Numerical control apparatuses are commonly used to drive a plurality of motors, drive a table via a ball screw and position a tool in a desired position. Such a mechanism produces mechanical backlash and variations in the pitch of the ball screw (pitch error).

Consequently, to reduce the influence of such backlash and pitch error, correction data such as backlash correction and pitch error correction is generated. When controlling the tip portion of a tool, correction of the tool length and correction of the tool diameter are used as correction data depending on the machining conditions.

FIG. 8 is a block diagram relating to the position control of a motor, for explaining the handling of correction data. As illustrated in FIG. 8, correction data C that is generated is added to a position command P of the motor, to generate a corrected position command Pc. Then, a position feedback Pf that is detected by a detector D of the motor M is subtracted from the corrected position command Pc and the subtraction result is output to a motor controller, and by this means, the motor M is controlled.

As described with reference to FIG. 8, it is common that correction data is superimposed on a position command of a motor, which is controlled. For example, Japanese Patent Laid-Open Publication No. 3-58102 discloses improving the accuracy of positioning by changing the amount of backlash correction according to the feeding direction and feeding speed.

FIG. 9A is a diagram illustrating a command path that is calculated from a position command of an end of the motor when backlash correction is added to a position command for a circular arc, and FIG. 9B is a diagram illustrating its feedback path. The circular arcs illustrated in these drawings correspond to the position command P of the motor. Furthermore, the command path indicated by the broken lines in FIG. 9A corresponds to the corrected position command Pc, and the feedback path indicated by the broken lines in FIG. 9B corresponds to the position feedback Pf. In these drawings, since the correction data C (backlash correction) is added to the position command P, the command path (FIG. 9A) and the feedback path (FIG. 9B) have shapes that deviate from the circular arcs corresponding to the position command P.

Furthermore, FIG. 9C is a drawing that is similar to FIG. 9A and that illustrates a command path calculated from a position command of an end of the motor when pitch error correction is added to the position command for the circular arc, and FIG. 9D is a drawing that is similar to FIG. 9B and that illustrates its feedback path. Furthermore, the command path illustrated in FIG. 9C corresponds to the corrected position command Pc, and the feedback path illustrated in FIG. 9D corresponds to the position feedback Pf. In these drawings, since the correction data C (pitch error correction) is added to the position command P, the command path (FIG. 9C) and the feedback path (FIG. 9D) deviate from the circular arcs corresponding to the position command P.

In this way, when the correction data C is superimposed on the position command P of the motor, the tool path to be calculated based on the corrected position command Pc does not match the path corresponding to the position command P. In other words, these paths differ from each other based on the correction data.

Compared to a mechanical error, a transient error due to the delay of the servo is significant. Consequently, when checking the response delay of the motor in the actual machine tool to which correction data is applied, or when adjusting the servo, it is necessary to temporarily invalidate the correction data. In other words, the path is checked by making the path calculated from the corrected position command Pc match the path calculated from the position command P of the motor. However, such a technique is very complex and time-consuming for an operator.

The present invention has been made in view of the above backgrounds, and it is therefore an object of the present invention to provide a path display apparatus that is capable of checking the response delay of the motor and performing servo adjustment using even a simpler method even when using an actual machine tool to which correction data such as backlash correction and pitch error correction is applied.

SUMMARY OF THE INVENTION

To achieve the above object, according to a first mode, a path display apparatus that displays the path of the tip point of a tool of a machine tool that controls the position and posture of the tool by a plurality of drive axes is provided, the path display apparatus including: a first position command acquiring unit that acquires first position command, generated by a numerical control apparatus, for a plurality of motors that drive the plurality of drive axes, respectively; a first position feedback acquiring unit that acquires first position feedback of each of the plurality of motors, from a plurality of position detectors that detect the respective positions of the plurality of motors every predetermined control cycle; a correction data acquiring unit that acquires correction data generated for each of the plurality of motors; a second position command calculating unit that subtracts the correction data from the first position command to calculate a second position command; a second position feedback calculating unit that subtracts the correction data from the first position feedback to calculate second position feedback; a command path display unit that displays a command path of the tip point of the tool, based on the second position command calculated by the second position command calculating unit; and a feedback path display unit that displays a feedback path of the tip point of the tool, based on the second position feedback calculated by the second position feedback calculating unit.

According to a second mode, based on the first mode, the path display apparatus further includes a second correction data calculating unit that calculates second correction data including control delay, using the correction data acquired by the correction data acquiring unit and a transfer function indicating responses of respective position loops of the plurality of motors, wherein the second position feedback calculating unit calculates second position feedback by subtracting the second correction data from the first position feedback.

According to a third mode, based on the second mode, the second correction data calculating unit uses a first-order lag filter corresponding to a position gain, as the transfer function.

According to a fourth mode, based on the first mode, the first position command is generated by adding the correction data to a position command read from an operation program of the machine tool.

The objects, features, advantages and other objects features, and advantages will become apparent from the detailed description of typical embodiments of the present invention given herein below illustrated in the accompanying drawings.

BRIEF DESCRIPTION OF THE DRAWINGS

FIG. 3 is a flowchart illustrating the operation of the path display apparatus according to the first embodiment of the present invention;

FIG. 7 is a flowchart illustrating the operation of the path display apparatus according to the second embodiment of the present invention;

DETAILED DESCRIPTION

Embodiments of the present invention will be described below with reference to the accompanying drawings. In the following drawings, the same members are assigned the same reference codes. The scale in these drawings has been changed for ease of explanation.

Figure 1:
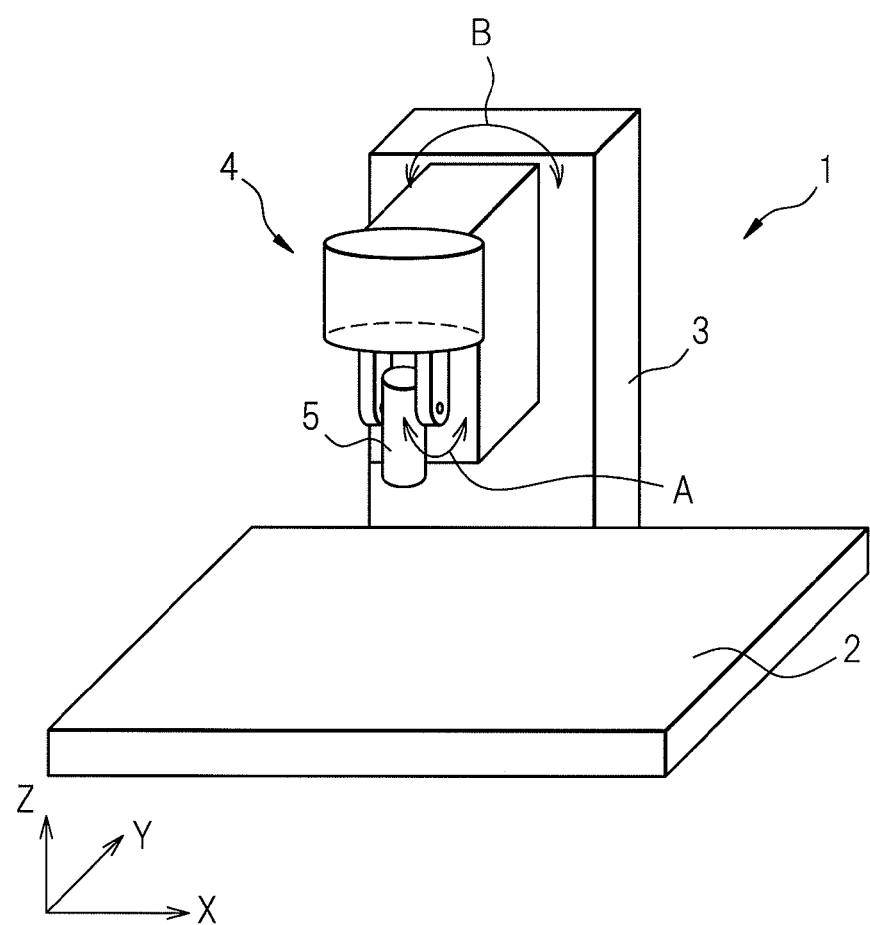
FIG. 1 is a perspective view of a machine tool connected to a path display apparatus based on the present invention.

FIG. 1 is a perspective view of a machine tool connected to a path display apparatus based on the present invention. The machine tool 1 illustrated as an example in FIG. 1 is a five-axis machine tool. The machine tool 1 includes a table 2 on which a workpiece (not illustrated) is placed, and a column 3 that moves, relatively, in three directions (X axis, Y axis and Z axis) that are perpendicular to each other, with respect to the table 2. As illustrated in this drawing, a head 4 extends horizontally from the column 3, and the head 4 rotates around the B axis, which is parallel to the surface of the table 2. Furthermore, a tool 5, which can rotate around an A axis that is perpendicular to both the B axis and the surface of the table 2, is attached to the head 4.

Consequently, the machine tool 1 controls the position and posture of the tool 5 by means of three linear-motion axes (X axis, Y axis and Z axis) and two rotary axes (A axis and B axis), and processes the workpiece on the table 2. However, even when the tool 5 is fixed to the table 2 and the workpiece (not illustrated) is attached to the tip of the head 4, this is within the scope of the present invention. Also, the X axis, Y axis, Z axis, A axis and B axis may also be referred to as "drive axes."

Figure 2:
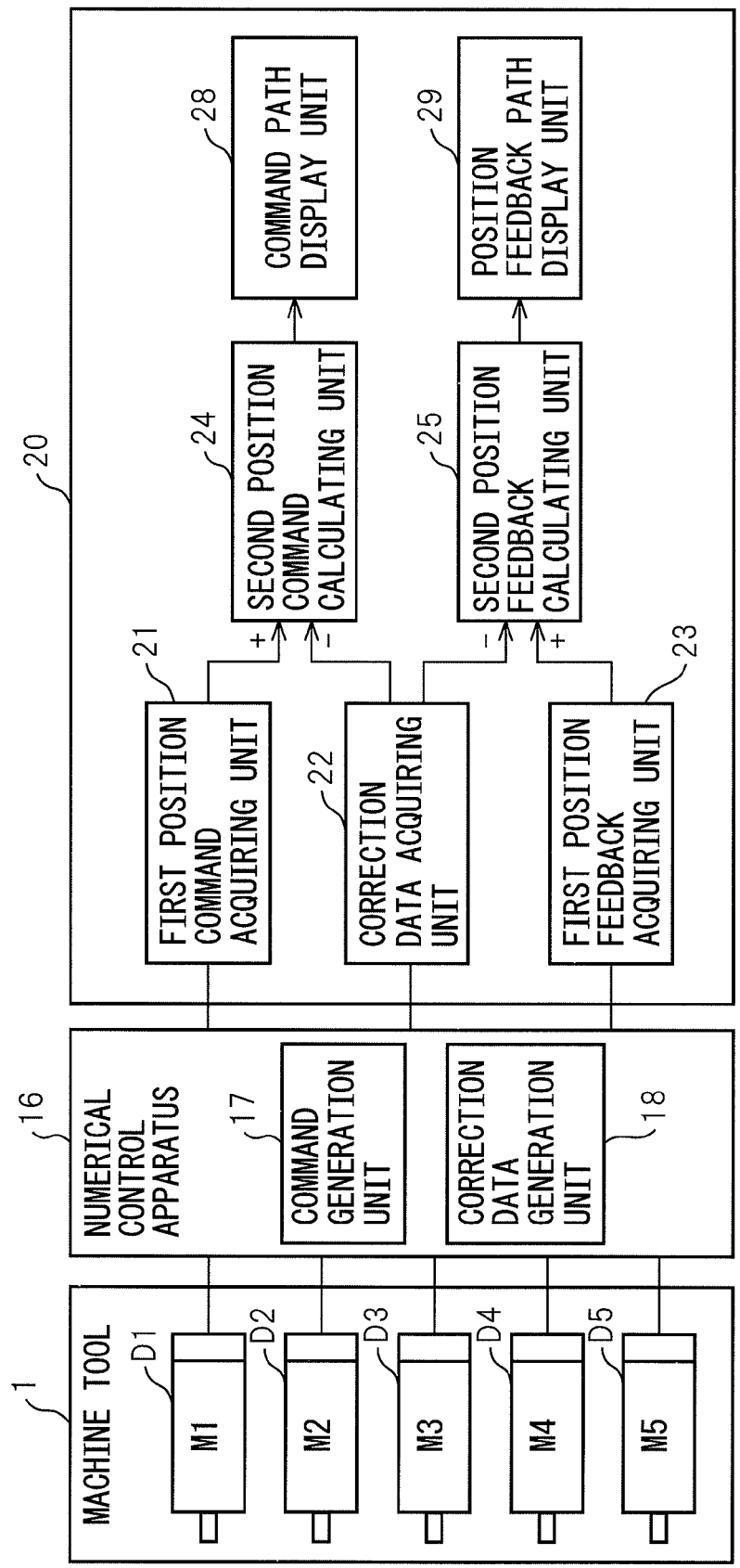
FIG. 2 is a function block diagram of a path display apparatus based on a first embodiment of the present invention.

FIG. 2 is a function block diagram of the path display apparatus based on the first embodiment of the present invention. As illustrated in FIG. 2, the path display apparatus 20 is connected to the machine tool 1 via a numerical control apparatus 16. The machine tool 1 includes motors M1 to M5 that drive respective drive axes. These motors M1 to M5 are provided with position detectors D1 to D5, respectively, to detect the positions of the drive axes every predetermined control cycle.

Furthermore, the numerical control apparatus 16 includes a command generation unit 17 that generates a corrected position command Pc with respect to each drive axis, per predetermined control cycle. Furthermore, the numerical control apparatus 16 includes a correction data generation unit 18 that generates correction data C. The correction data C includes backlash correction, pitch error correction, tool length correction or tool diameter correction. The method of calculating correction data C such as these is publicly known, and therefore a description thereof is omitted.

Figure 8:
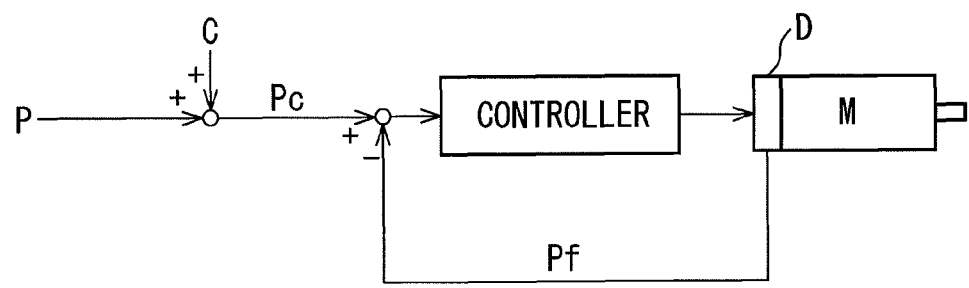
FIG. 8 is a block diagram relating to position control of a motor, for explaining the handling of correction data.
Figure 9A:
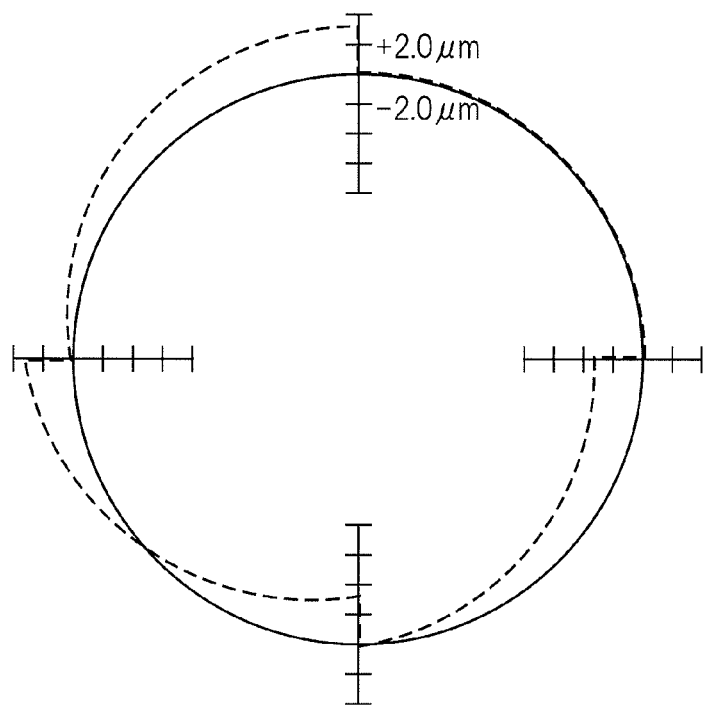
FIG. 9A is a diagram illustrating a command path calculated from a position command of an end of the motor when backlash correction is added to a position command for a circular arc.
Figure 9B:
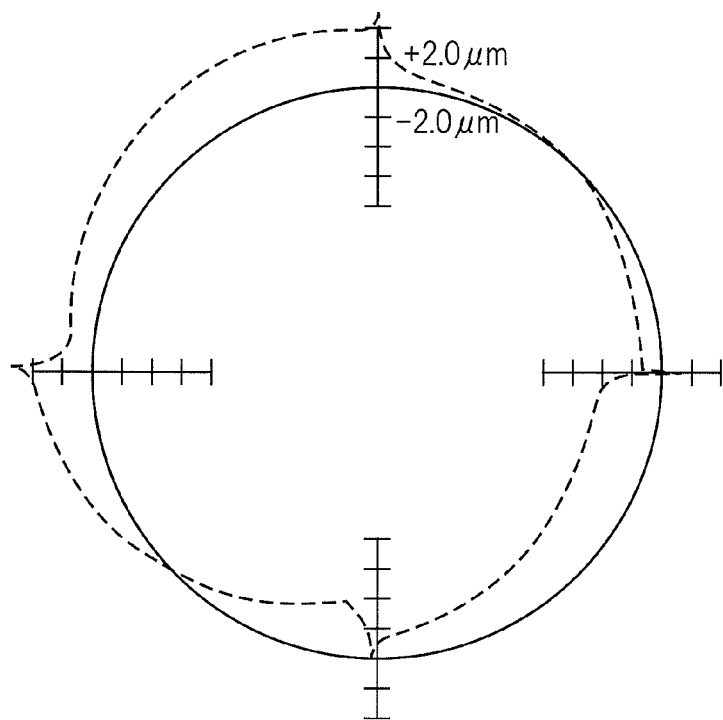
FIG. 9B is a diagram illustrating the feedback path in FIG. 9A.
Figure 9C:
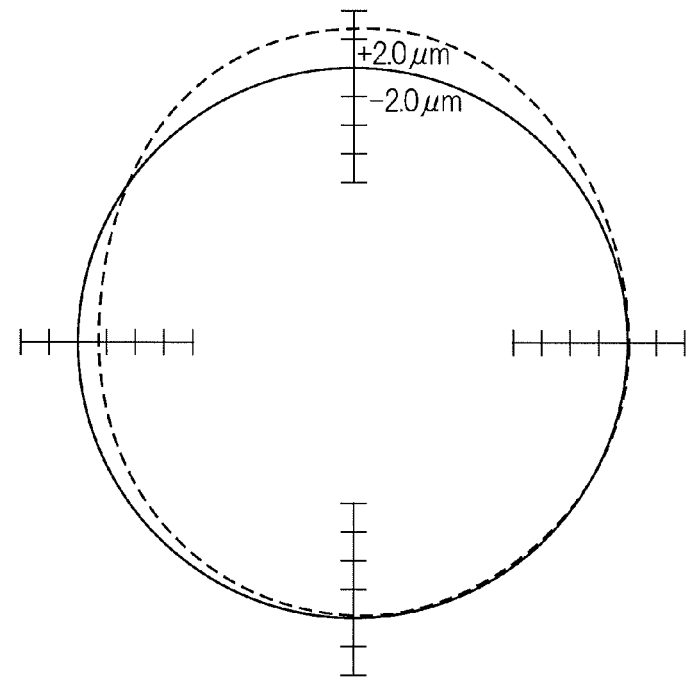
FIG. 9C is a diagram illustrating a command path calculated from a position command of an end of the motor when pitch error correction is added to a position command for a circular arc.
Figure 9D:
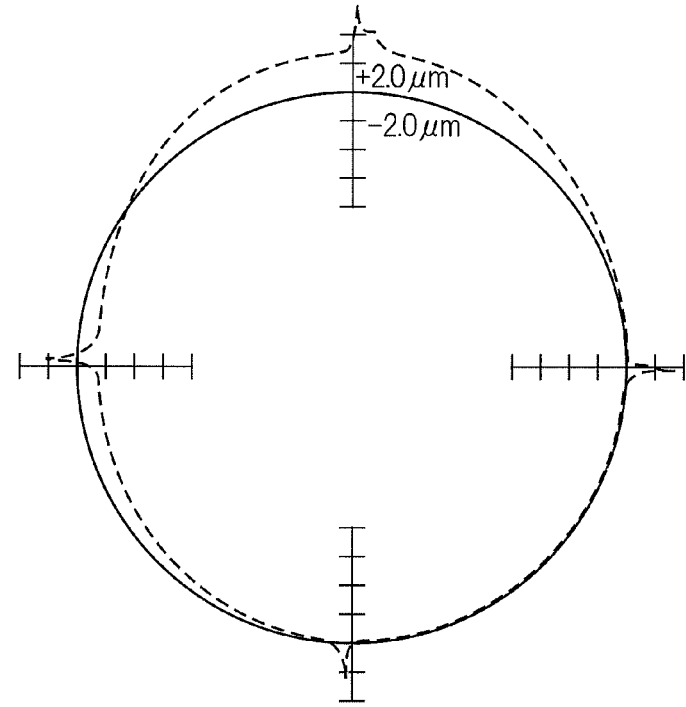
FIG. 9D is a diagram illustrating the feedback path in FIG. 9C.

As described with reference to FIG. 8, the command generation unit 17 reads a position command P from the operation program of the machine tool 1, and, by adding the correction data C to this, generates a corrected position command Pc. Position feedback Pf detected by the position detector D is subtracted from the corrected position command Pc and supplied to a motor controller.

As illustrated in FIG. 2, the path display apparatus 20 includes a first position command acquiring unit 21 that acquires the corrected position command Pc of each drive axis generated by the command generation unit 17 as the first position command, a correction data acquiring unit 22 that acquires the correction data C of each drive axis generated by the correction data generation unit 18, and a first position feedback acquiring unit 23 that acquires a position feedback Pf for each drive axis detected by the position detectors D1 to D5 as the first position feedback.

Furthermore, as can be seen from FIG. 2, the path display apparatus 20 further includes a second position command calculating unit 24 that calculates a second position command Pc' by subtracting the correction data C acquired by the correction data acquiring unit 22 from the first position command Pc acquired by the first position command acquiring unit 21, and a second position feedback calculating unit 25 that calculates second position feedback Pf' by subtracting the correction data C acquired by the correction data acquiring unit 22 from the first position feedback Pf acquired by the first position feedback acquiring unit 23.

Furthermore, the path display apparatus 20 also includes a command path display unit 28 that calculates and displays a command path of the tip of the tool 5 based on the second position command Pc', and a position feedback path display unit 29 that calculates and displays a position feedback path of the tip of the tool 5 based on the second position feedback Pf'. The command path display unit 28 and the position feedback path display unit 29 are CRTs or liquid crystal monitors or the like, or the same CRT or liquid crystal monitor may be used in common for these.

In this connection, the technique of calculating the command path and position feedback path will be described. Referring back to FIG. 1, assume that the coordinates of the five drive axes are x(t), y(t), z(t), a(t) and b(t). Assuming that the intersection between the A axis and B axis is M, the coordinates of the intersection M are represented by (x(t), y(t), z(t)). Given that the length from the intersection M to the tip of the tool 5 is L and the position where the tool 5 is pointed straight downward is the reference position (origin) of the A axis and the B axis, the coordinates of the tip of the tool 5 are represented as follows:

$$Px(t)=x(t)+L\times\cos(a(t))\times\sin(b(t))$$

$$Py(t)=y(t)+L\times\sin(a(t))$$

$$Pz(t)=z(t)-L\times\cos(a(t))\times\cos(b(t))$$

In this way, the coordinates of the tip of the tool 5 can be calculated from the position information and mechanical structural conditions of the five drive axes.

FIG. 3 is a flowchart illustrating the operation of the path display apparatus according to the first embodiment of the present invention. The operation of the path display apparatus 20 according to the first embodiment of the present invention will be described below with reference to FIG. 2 and FIG. 3.

First, in step S10 in FIG. 3, time t is set to 0. In step S11, the first position command acquiring unit 21 acquires the corrected position commands Pc(t) for the respective motors M1 to M5 at time t as the first position commands. In step S12, the first position feedback acquiring unit 23 acquires position feedback Pf(t) for the respective motors M1 to M5 at time t as the first position feedback. Furthermore, in step S13, the correction data acquiring unit 22 acquires correction data C(t) at time t.

Then, in step S14, the second position command calculating unit 24 subtracts the correction data C(t) from the first position command Pc(t) to generate second position commands Pc'(t) for the respective motors M1 to M5 at time (t). Then, in step S15, the second position feedback calculating unit 25 subtracts the correction data C(t) from the first position feedback Pf(t) to calculate second position feedback Pf'(t) of the respective motors M1 to M5 at time (t). By this means, the second position commands Pc'(t) and the second position feedback Pf'(t) do not include the correction data C(t).

Then, in step S16, the command path display unit 28 displays the command path of the tip point of the tool 5 at time t based on the second position commands Pc'(t). Furthermore, in step S17, the position feedback path display unit 29 displays the position feedback path of the tip point of the tool 5 at time t based on the second position feedback Pf'(t).

In step S18, a comparison is made between the current time t and a predetermined end time, and, when time t is equal to or later than the end time, the process is finished. On the contrary, when time t is not equal to or later than the end time, in step S19, a predetermined minute time Δt corresponding to the control cycle is added to time t, and the step returns to step S11. Then, the processes of step S11 to step S19 are repeated until time t reaches or exceeds the end time.

Figure 4A:
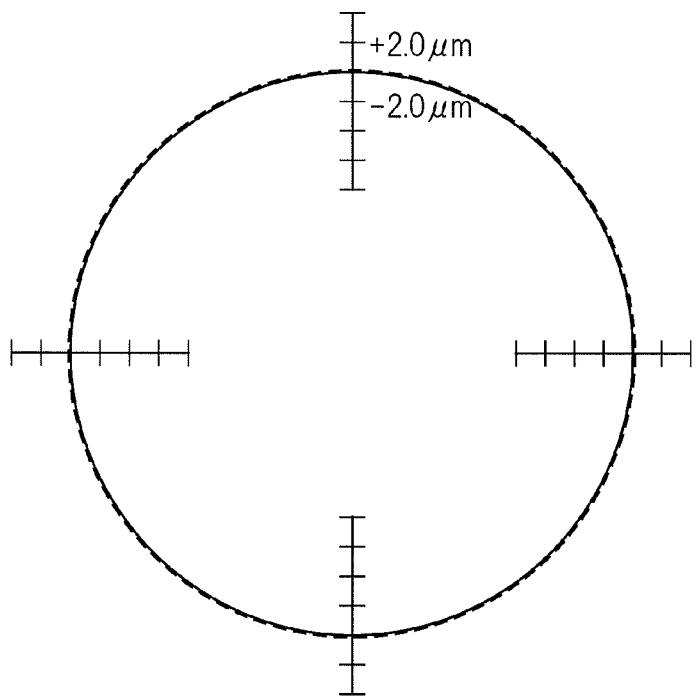
FIG. 4A is a diagram illustrating a command path generated based on a second position command.
Figure 4B:
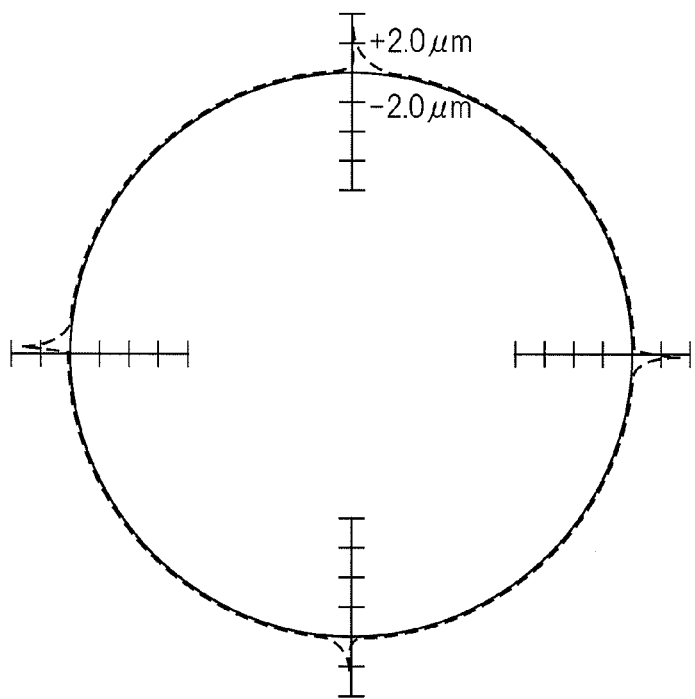
FIG. 4B is a diagram illustrating a position feedback path generated based on second position feedback.

FIG. 4A is a diagram illustrating a command path that is generated based on the second position command Pc', and FIG. 4B is a diagram illustrating a position feedback path that is generated based on the second position feedback Pf'. These drawings illustrate machining errors when cutting a workpiece along a path of a circular-arc and assume the center of the circular-arc path as the origin. Furthermore, the solid lines in these drawings represent the position commands P determined in accordance with the operation program, and the broken lines represent second position commands Pc' and second position feedback Pf', respectively. In FIG. 4A, the position command P is substantially superimposed on the second position command Pc'.

In the present invention, correction data C is subtracted from the first position command Pc and from the first position feedback Pf, so that it is possible to eliminate the influence of the correction data C. Therefore, as can be seen from FIG. 4A and FIG. 4B, the second position command Pc' and second position feedback Pf' can be easily compared with the position command P.

Therefore, the present invention allows the response delay of the motor to be checked very easily even in the case of the actual machine tool 1 to which the correction data C such as backlash correction and pitch error correction is applied. Moreover, since it is not necessary to invalidate the correction data C temporarily, it is possible to appropriately adjust the servo for the actual machine tool to which correction data is already applied, using a simpler method.

Figure 5:
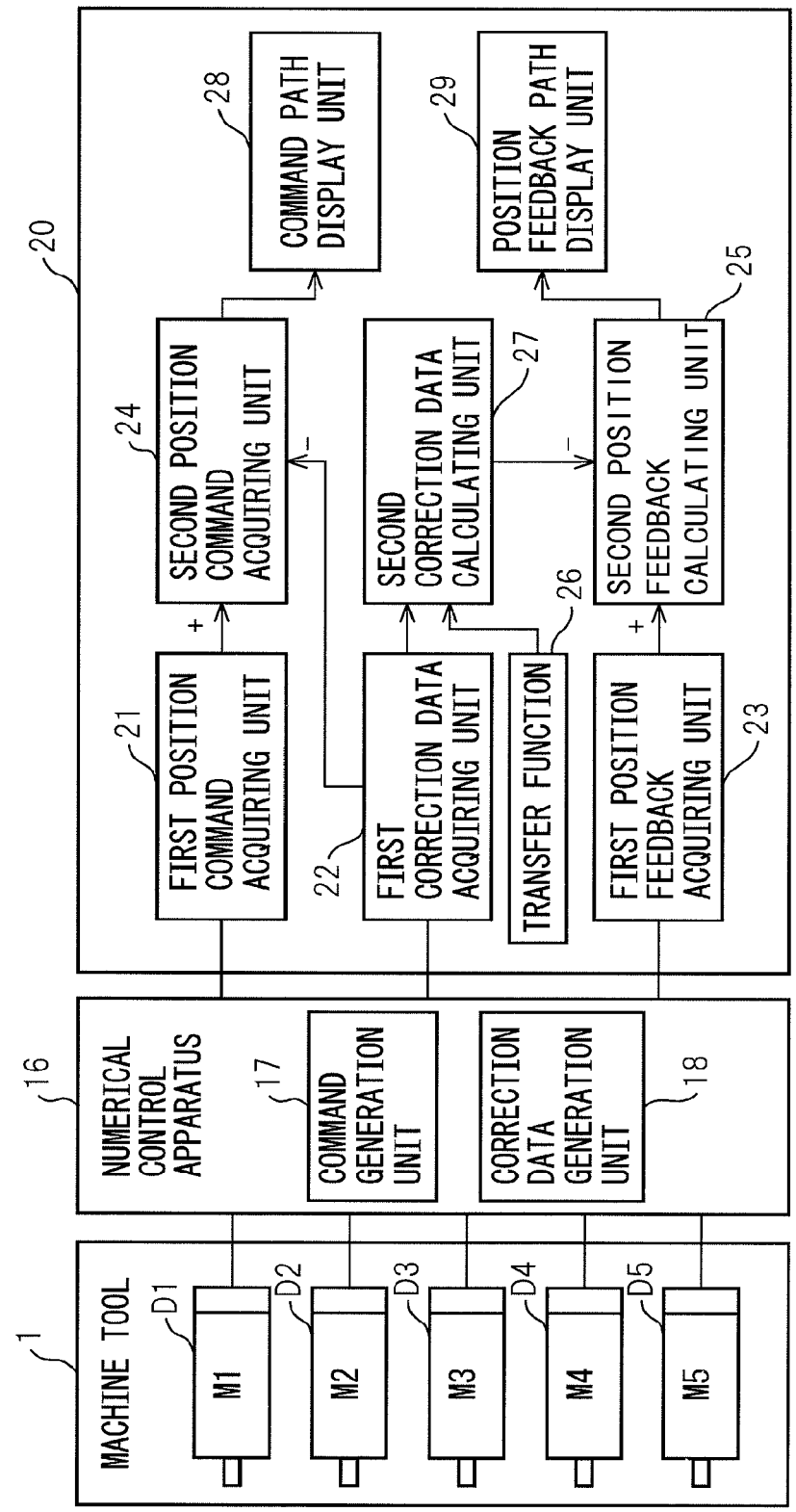
FIG. 5 is a function block diagram of a path display apparatus based on a second embodiment of the present invention.

FIG. 5 is a function block diagram of a path display apparatus based on a second embodiment of the present invention. In FIG. 5, a first correction data acquiring unit 22 has a function similar to that of the correction data acquiring unit 22 illustrated in FIG. 2.

Furthermore, a second correction data calculating unit 27 illustrated in FIG. 5 calculates second correction data C' based on the correction data C acquired by the first correction data acquiring unit 22 and a transfer function 26. Then, a second position command calculating unit 24 subtracts the first correction data C from a first position command Pc to generate a second position command Pc', and a second position feedback calculating unit 25 subtracts the second correction data C' from the first position feedback Pf to generate second position feedback Pf'. Furthermore, other members similar to those in FIG. 2 have functions similar to those described above, and therefore their detailed descriptions will be omitted.

In this connection, an output in response to an input, in control, normally has a certain degree of delay. In other words, a response of the position feedback Pf(t) in response to the correction data C(t) also has a delay. In the first embodiment, when the correction data C(t) is directly subtracted from the position feedback Pf(t), this means that a delay in control is not taken into account. Therefore, in such a case, the position feedback Pf(t) decreases by an amount corresponding to the control delay. Consequently, it is preferable to calculate the transfer function of the position loop illustrated in FIG. 8 in advance and calculate the second correction data C'(t) based on the transfer function.

Figure 6A:
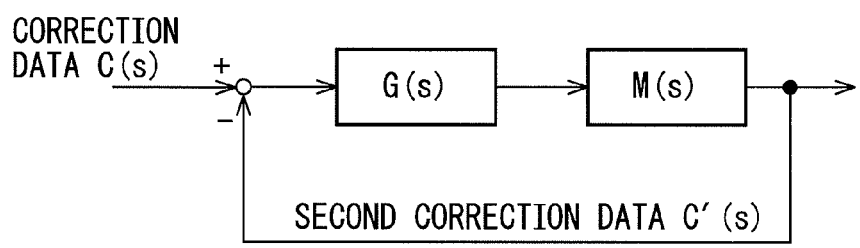
FIG. 6A is a block diagram relating to position control of a motor.

FIG. 6A is a block diagram relating to position control of the motor. In FIG. 6A, G(s) represents a transfer function of a motor controller including position control, speed control and current control. M(s) represents the transfer function of the motor.

Then, assume that the output when the correction data C(t) is input to the position control loop is second correction data C'(t). Assume that the Laplace transforms of the correction data C(t) and second correction data C'(t) are C(s) and C'(s), respectively (see FIG. 6A). C'(s) is represented by following equation 1. Then, by applying the inverse Laplace transform to equation 1, second correction data C'(t) is obtained as represented in equation 2.

$$C'(s) = \frac{M(s)C(s)}{1 + M(s)G(s)} C(s) \quad \text{(Equation 1)}$$

$$C'(t) = L^{-1}(C'(s)) \quad \text{(Equation 2)}$$

Figure 6B:
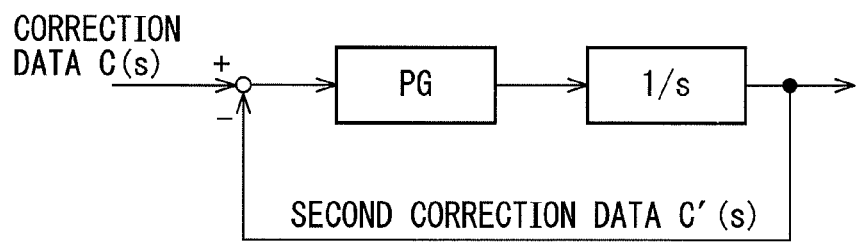
FIG. 6B is another block diagram relating to position control of a motor.

In addition, FIG. 6B is another block diagram relating to position control of the motor. Assuming that the transfer function to represent the response of the speed loop is 1, the block diagram of the position loop using a position gain PG is as illustrated in FIG. 6B. The transfer function in FIG. 6B is a first-order lag system as represented in following equation 3.

$$C'(s) = \frac{PG}{s + PG} C(s) \quad \text{(Equation 3)}$$

For the transfer function 26 illustrated in FIG. 5, assume that the transfer function represented by equation 1 or equation 3 is employed. A first-order lag filter corresponding to the position gain may also be employed as the transfer function 26. In this case, it is apparent that the control delay can be handled with a relatively simple configuration.

FIG. 7 is a flowchart illustrating the operation of the path display apparatus according to the second embodiment of the present invention. Hereinafter, the operation of a path display apparatus 20 according to the second embodiment of the present invention will be described with reference to FIG. 5 to FIG. 7.

Since step S20 to step S23 illustrated in FIG. 7 mostly correspond to step S10 to step S13 illustrated in FIG. 3, their descriptions will be omitted. However, in step S23, assume that the first correction data acquiring unit 22 acquires correction data C from the correction data generation unit 18.

Then, in step S24, the second correction data calculating unit 27 multiplies the correction data C(t) of the motors M1 to M5 at time t by the transfer function 26 to calculate second correction data C'(t). As described with reference to equation 1 to equation 3, the calculated second correction data C'(t) includes control delay.

Then, in step S25, the second position command calculating unit 24 subtracts the first correction data C(t) from the first position command Pc(t) to generate second position command Pc'(t) of the respective motors M1 to M5 at time (t). Then, in step S26, the second position feedback calculating unit 25 subtracts the second correction data C'(t) from the first position feedback Pf(t) to calculate second position feedback Pf'(t) of the respective motors M1 to M5 at time (t). By this means, the second position command Pc'(t) does not include the first correction data C(t) and the second position feedback Pf'(t) does not include the second correction data C'(t).

After that, in step S27, the command path display unit 28 displays the command path of the tip point of the tool 5 at time t based on the second position command Pc'(t). Furthermore, in step S28, the position feedback path display unit 29 displays the position feedback path of the tip point of the tool 5 at time t based on the second position feedback Pf'(t).

Step S29 and step S30 are similar to aforementioned step S18 and step S19, and therefore descriptions thereof are omitted. In short, with the second embodiment, assume that the processes of step S21 to step S30 are also repeated until time t reaches or exceeds the end time. Since the path display of the command path display unit 28 and the position feedback path display unit 29 with the second embodiment is similar to that illustrated in FIG. 4, descriptions will be omitted.

Thus, with the second embodiment, the second correction data C'(t) taking into account the control delay is subtracted from the second position feedback Pf(t). In other words, since the control delay is taken into account in the second embodiment, it is apparent that the second embodiment can check a response delay of the motor more accurately or perform servo adjustment more accurately compared to the first embodiment.

Effects of the Invention

According to the first mode, since correction data is subtracted from the first position command (corrected position command) and the first position feedback, it is possible to remove the influence of backlash correction or pitch error correction, and calculate and display path data that can be directly compared with a path that is defined from the initial position command.

Therefore, even with an actual machine tool to which correction data such as backlash correction or pitch error correction is applied, it is possible to check the response delay of the motor or perform servo adjustment using a simpler method.

According to the second mode, since control delay is taken into account, it is possible to check the response delay of the motor or perform servo adjustment more accurately than the first mode of the invention.

With the third mode, it is possible to handle control delay with a relatively simple configuration.

With the fourth mode, the first position command is clarified.

Although the present invention has been described using typical embodiments, a person skilled in the art should understand that the above-described changes, and various other changes, omissions, and additions are possible without departing from the scope of the present invention.

The invention claimed is:

1. A path display apparatus that displays a path of a tip point of a tool of a machine tool, to which correction data including backlash correction and pitch correction is applied, that controls the position and posture of the tool by a plurality of drive axes, the path display apparatus comprising:
    a position command acquiring unit that acquires a first position command, generated by a numerical control apparatus, for a plurality of motors that drive the plurality of drive axes, respectively;
    a position feedback acquiring unit that acquires first position feedback of each of the plurality of motors, from a plurality of position detectors that detect the respective positions of the plurality of motors every predetermined control cycle;
    a correction data acquiring unit that acquires correction data generated for each of the plurality of motors;
    a position command calculating unit that subtracts the correction data from the first position command to calculate a second position command;
    a position feedback calculating unit that subtracts the correction data from the first position feedback to calculate second position feedback;
    a command path display unit that displays a command path of the tip point of the tool, based on the second position command calculated by the position command calculating unit; and
    a feedback path display unit that displays a feedback path of the tip point of the tool, based on the second position feedback calculated by the position feedback calculating unit.

2. The path display apparatus as defined in claim 1, further comprising a correction data calculating unit that calculates second correction data including control delay, using the correction data acquired by the correction data acquiring unit and a transfer function indicating responses of respective position loops of the plurality of motors,
   wherein the position feedback calculating unit calculates the second position feedback by subtracting the second correction data from the first position feedback.

3. The path display apparatus as defined in claim 2, wherein the correction data calculating unit uses a first-order lag filter corresponding to a position gain, as the transfer function.

4. The path display apparatus as defined in claim 1, wherein the first position command is generated by adding the correction data to a position command read from an operation program of the machine tool.

* * * * *